United States Patent Office 3,527,757
Patented Sept. 8, 1970

3,527,757
ALKYLATION OF AMINES WITH ALKYLENEIMINES
Thomas H. Austin and Walter H. Brader, Jr., Austin, Tex., assignors to Jefferson Chemical Company, Inc., a corporation of Delaware
No Drawing. Filed Dec. 16, 1966, Ser. No. 602,158
Int. Cl. C07d 87/40
U.S. Cl. 260—247.5
7 Claims

ABSTRACT OF THE DISCLOSURE

Primary and secondary amines are aminoalkylated by reaction with alkyleneimines in the presence of solid, acidic dehydration or cracking catalysts. Unlike prior art mineral and Lewis acid catalysts, these catalysts do not react with either the reactants or products and may be easily removed from the reaction mixture. The amines prepared by the process find application as epoxy curing agents and as intermediates in the preparation of corrosion inhibitors, pharmaceuticals, emulsifiers, textile chemicals and rubber chemicals.

BACKGROUND OF THE INVENTION

This invention relates to a method for the aminoalkylation of primary and secondary amines with alkyleneimines using a solid acidic catalyst.

The reaction of alkyleneimines with amines is well known. Heretofore, this reaction has been catalyzed by inorganic mineral and Lewis acids. The principal difficulty with the use of these catalysts is that the acids react with both the reactants and the products and are separated from the products only with difficulty.

SUMMARY OF THE INVENTION

We have now discovered that the disadvantages of the prior art may be overcome by the use, as catalysts, of solid, acidic dehydration or cracking catalysts. These solid catalysts do not react with the reactants or products and can be separated from the products with ease. Further, these catalysts are specific since a single molecule of the alkyleneimine may be reacted with primary or secondary amines to give high yields of the aminoalkylated product with very little formation of higher polyalkylene polyamines. The reaction may be carried out in a batch or continuous manner.

Amines that may be obtained by our process find application as epoxy curing agents and as intermediates in the preparation of corrosion inhibitors, pharmaceuticals, emulsifiers, textile chemicals and rubber chemicals.

DESCRIPTION OF THE PREFERRED EMBODIMENT

The catalyst for use in our process is a solid, acidic dehydration or cracking catalyst. Examples of such catalysts are well known to those skilled in the art. Specific catalysts that may be used include silica, alumina, silica-alumina, thoria, chromia, ferric oxide, acid clays such as Superfiltrol, which is a bentonite clay that has been treated with sulphuric acid, and metal phosphates such as aluminum phosphate. There appears to be a correlation between the catalytic activity and the acidity of the catalyst with the more acidic catalyst being the more active. Silica-alumina is a particularly active catalyst promoting rapid and complete conversion of the alkyleneimine and high yields of the product. For this reason, silica-alumina is a preferred catalyst for our process.

The amount of catalyst employed can best be expressed in terms of a space velocity of 0.5–20 grams of alkyleneimine and amine per hour per gram of catalyst. While space velocities are normally associated with continuous processes, they may also be calculated for batch processes. For example, a batch process employing 100 grams of reactants and 5 grams of catalyst and allowed to continue for two hours could be said to have a space velocity of 10 grams of reactants per hour per gram of catalyst.

The alkyleneimine to be employed is one having the formula:

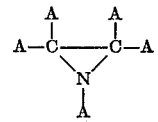

wherein each A may be hydrogen or a $C_1$–$C_{14}$ alkyl group. Suitable alkyleneimines include ethyleneimine, N-methylethyleneimine, 1,2-propyleneimine, 2,3-butyleneimine, 1,2-butyleneimine and 1,2-dodeceneimine. The alkyleneimines of choice or ethyleneimine and 1,2-propyleneimine.

The alkyleneimine may be reacted with any primary or secondary aliphatic, aromatic or heterocyclic mono- or polyamine. Such monoamines may be represented by the formula:

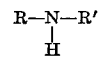

wherein R may be an aliphatic or aromatic hydrocarbon group containing from 1 to 14 carbon atoms, R' may be hydrogen or R, and R and R' taken together may form a 5 to 8 membered heterocyclic ring with the nitrogen atom. Suitable monoamines are ethylamine, diethylamine, butylamine, cyclohexylamine, octylamine, dodecylamine, methyldodecylamine, aniline, methylanaline, benzylamine, naphthylamine, piperidine and morpholine.

Polyamines may be represented by the formula:

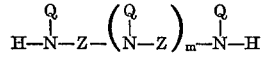

wherein Z is a bivalent aliphatic or aromatic hydrocarbon radical containing from 2 to 14 carbon atoms, Q is hydrogen or an aliphatic or aromatic hydrocarbon group containing from 1 to 14 carbon atoms and two Q groups may be taken together as another Z group between nitrogen atoms, and m is 0–10. Examples of such polyamines include ethylenediamine, N,N'-dimethylethylenediamine, 1,2-propanediamine, 1,3-propanediamine, hexamethylenediamine, p-phenylenediamine, diethylenetriamine, triethylenetetramine, piperazine, N-aminoethylpiperazine, methyliminobispropylamine, 2,4-tolylenediamine and N,N'-bis(3-aminopropyl)piperazine.

The reaction may be run at temperatures within the range of 50° C. to 200° C., but preferably within the range of 100° C. to 120° C. The pressure may be within the range of atmospheric to about 500 p.s.i.g. and is preferably from 10 to 50 p.s.i.g. Essentially any ratio of imine to amine may be used. The molar ratio is not critical since the catalysts are specific, resulting substantially in a 1:1 reaction.

Our invention will be further illustrated by the following examples:

Example I

To a stirred one-liter autoclave were added 395 grams (4.53 mols) of morpholine and 39 grams of finely pulverized silica-alumina catalyst. The clave was sealed, flushed with nitrogen and heated to 100° C. Ethyleneimine was pressured in slowly with nitrogen pressure over a period of 40 minutes while maintaining the temperature of the reaction between 105° C. and 117° C. A total of 65 grams (1.51 mols) of ethyleneimine was used. The pressure of the reactor reached a maximum of 40 p.s.i.g. Toward the end of the reaction some nitrogen was admitted to maintain pressure. The mixture was heated one and one-quarter hours at 109° C. to 111° C. and the reactor was cooled. The catalyst was filtered from the reaction mixture and washed with ether. The filtrate and the ether washings were distilled to give 144 grams (73% of theory based on starting ethyleneimine) of N-β-aminoethylmorpholine of 99.2% purity (by vapor phase chromatography). The conversion of ethyleneimine was quantitative.

Example II

Example I was repeated using aluminum phosphate as the catalyst. The yield of N-β-aminoethylmorpholine was 59%. The conversion of ethyleneimine was quantitative.

Example III

Example I was repeated using activated gamma-alumina as catalyst. The yield of N-β-aminoethylmorpholine was 39%. The conversion of ethyleneimine was 72%.

Example IV

Triethylenetetramine and ethyleneimine were reacted under the conditions described in Example I in the presence of silica-alumina as catalyst. Conversion of ethyleneimine was 100% and the yield of tetraethylenepentamine was 60%.

It can be seen that good conversion and good yields of products are obtained using our catalysts. It is also to be observed that the catalyst can be easily separated from the products by a simple filtration step. There is no problem of reaction of the catalyst with either the starting materials or the product.

We claim:

1. In a method for the catalytic reaction of an alkyleneimine with a mono- or polyamine, the improvement which comprises: treating said amine with said alkyleneimine in the presence of a solid, acidic catalyst of dehydration or a cracking catalyst at a temperature of 50–200° C., a pressure of atmospheric to 500 p.s.i.g. and a space velocity of 0.5–20 grams of said alkyleneimine and amine per hour per gram of catalyst.

2. A method according to claim 1 wherein the alkyleneimine is ethyleneimine, N-methylethyleneimine, 1,2-propyleneimine, 2,3-butyleneimine, 1,2-butyleneimine or 1,2-dodeceneimine and the amine is ethylamine, diethylamine, butylamine, cyclohexylamine, octylamine, dodecylamine, methyldodecylamine, aniline, methylaniline, benzylamine, naphthylamine, piperidine, morpholine, ethylenediamine, N,N'-dimethylethylenediamine, 1,2-propanediamine, 1,3-propanediamine, hexamethylenediamine, p-phenylenediamine, diethylenetriamine, triethylenetetramine, piperazine, N-aminoethylpiperazine, methyliminobispropylamine, 2,4-tolylenediamine or N,N'-bis(3-aminopropyl)piperazine.

3. A method as in claim 1 wherein the catalyst is silica-alumina.

4. A method as in claim 1 wherein the temperature is 100° C. to 120° C. and the pressure is 10 to 50 p.s.i.g.

5. A method as in claim 4 wherein the catalyst is silica-alumina.

6. A method as in claim 5 wherein the alkyleneimine is ethyleneimine.

7. A method as in claim 5 wherein the alkyleneimine is 1,2-propyleneimine.

No references cited.

NICHOLAS S. RIZZO, Primary Examiner

J. TOVAR, Assistant Examiner

U.S. Cl. X.R.

260—268, 293, 563, 570.5, 999